United States Patent Office 3,846,140
Patented Nov. 5, 1974

3,846,140
ELECTRICAL RESISTOR INKS
Karl J. Youtsey, Chicago, William C. Holt, Jr., Prospect Heights, and Robert D. Carnahan, Barrington, Ill., assignors to Universal Oil Products Company, Des Plaines, Ill.
No Drawing. Filed Aug. 18, 1972, Ser. No. 281,880
Int. Cl. B44d 1/18; C09d 11/00, 11/02, 11/16
U.S. Cl. 106—20       12 Claims

ABSTRACT OF THE DISCLOSURE

Electrical resistor inks comprising a mixture of at least one pyropolymeric semi-conducting organic refractory oxide material and a vehicle consisting of a binder such as a synthetic resin or a varnish, and a suitable solvent or oil, etc. are useful in forming resistors in electrical circuits, especially on printed circuit boards and on the ceramic substrates used for thick film circuits. In addition the ink may contain other components such as metal powders, anti-skinning agents, drying agents, colored pigments, waxes, etc.

---

This invention relates to electrical resistor inks and more particularly to electrical resistor inks which contain at least one pyropolymeric semi-conducting organic refractory oxide material which possesses advantageous properties. In addition the invention also relates to resistors which are formed from these electrical resistor inks.

Heretofore it has been known in the prior art, that resistor inks may be prepared by utilizing a carbon or graphite pigment in a resin binder. However, the use of carbon black or graphite has a number of disadvantages, among them: (a) the obtaining of a given resistance value may require incorporation of dielectric additives in the formulation because of the fixed low resistivity of carbon black and graphite, (b) the rheological properties of the inks are highly variable because of the variety of formulations required to produce a series of resistance values, (c) the electronic performance characteristics vary for the various formulations for the same reason, and (d) batch to batch reproducibility of a given formulation is poor because of the variability of carbon black and graphite properties. However, in contradistinction to this, we have now discovered that all of these disadvantages may be eliminated by utilizing at least one pyropolymeric semi-conducting organic refractory oxide material of the type hereinafter set forth in greater detail as the pigment of an electrical resistor ink. By utilizing these pyropolymeric semi-conducting organic refractory oxide materials which possess controllable resistivities, it is possible to obtain a broad range of reproducible resistor characteristics. The resistance value of the resistor made from a given ink is determined by the oxide material and is not dominated by the vehicle characteristics, as in the case of the carbon or graphite inks. By having a constant volume concentration of the oxide material in the primary vehicle for all resistance values, it is possible to insure uniform rheological properties for screening purposes. Another advantage of utilizing the electrical resistor inks of the present invention is that there will be relatively low current noise in the resulting resistors as contrasted with the noise level found when utilizing carbon or graphite inks. In addition, there is no requirement for electrical lead attachments, and the inks, when dried, are easily trimmed by conventional laser and/or abrasive trimming techniques. Yet another advantage of utilizing the electrical resistor inks of the present invention is that the curing of the ink formulations can be effected at room temperature or can be air or oven dried if desired. This contrasts to the carbon or graphite type resistor in formulations where the curing temperature is usually required to be relatively high, that is, 300° C. or more, for a period of several hours in order to attempt to achieve a stable resistance.

Electrical resistor inks which constitute the present invention may find a wide variety of uses in the electrical field. For example, one application of resistor inks is to produce direct substitutes for discrete resistors in all types of electrical circuits, a particularly advantageous use being in connection with laminated printed circuit boards. The electrical resistor ink can be applied to either side of the circuit board, that is, the component side or the foil side, prior to the final soldering step in which discrete components are electrically attached. In addition, either single- or multi-circuit boards are suitable. For example, in the latter case, where multiple layers of circuits are involved, direct incorporation of the printed resistors in the layers provides an obvious benefit in lowering component densities where discrete components must be attached, thus resulting in a significant saving of space. In addition to the use hereinbefore described in laminated printed circuit boards the electrical resistor ink can be used in radiant heating panels for use in building construction in which the ink is applied to an inner sheet of panel prior to final lamination; coating an insulating fiber; as an anti-static spray to protect surfaces from static charge accumulation or as window defrosters in which the electrical resistor ink is applied in the form of a fine line to a window surface and after drying will act as a heating element. It is therefore readily apparent that the uses of an electrical resistor ink of the type hereinafter set forth in greater detail are widely varied and therefore an electrical resistor ink which possesses certain advantageous properties will be very desirable.

It is therefore an object of this invention to provide an electrical resistor ink which possesses certain advantageous properties.

Another object of this invention is to provide an electrical resistor ink containing, as one component thereof, a pyropolymeric semi-conducting organic refractory oxide material which possesses a resistivity within a desired range which will permit the use of the ink in certain applied situations.

In one aspect an embodiment of this invention resides in an electrical resistor ink comprising at least one pyropolymeric semi-conducting organic refractory oxide material, and a vehicle therefore comprising a binder including synthetic or naturally occurring resins, and an oil, solvent or mixture thereof.

A specific embodiment of this invention is found in an electrical resistor ink comprising a mixture of a pyropolymeric semi-conducting organic refractory oxide material which possesses a resistivity of $10^0$ ohm-centimeters, an alkyd resin, silver powder, and methyl isobutyl ketone.

Another specific embodiment of this invention is found in a resistor formed by applying an electrical resistor ink upon a solid surface and drying said ink.

Other objects and embodiments will be found in the following further detailed description of the present invention.

As hereinbefore set forth the present invention is concerned with novel compositions of matter comprising an electrical resistor ink. The term "ink" as used in the present specification and appended claims will refer to a liquid composition of matter which may be used in the form of an ink, as a paste, as a paint, etc. The ink will comprise a mixture of at least one pyropolymeric material or a mixture of two or more pyropolymeric semi-conducting organic refractory oxide materials, each of which possesses a dissimilar resistivity and a vehicle. The vehicle may be a mixture of a synthetic or naturally occurring resin, binder and a solvent in which the oxide material or materials is suspended, or may be an oil, or a mixture of an oil and a separate binder. In addition, it is also contemplated within the scope of this invention, that the ink may also contain other added accessories, such as: anti-skinning agents, drying agents, colored pigments, driers, waves, talcs, extending or viscous varnishes, thinners, body gums, shorteners and lengtheners, perfumes, plasticizers, anti-foam compounds, and also, if so desired, other solids in the form of metal powders which may provide special electrical and/or rheological properties to the finished composition of matter.

As hereinbefore set forth prior art inks or paints which contain carbon or graphite as the resistive component of the mixture are subject to certain disadvantages. For example certain carbons result in resistors which have a poor load-life or will require high curing temperatures when admixed with resins in order to provide resistance values which are stable during use. Graphites, both naturally occurring and synthetic, are also subject to these same disadvantages and in addition may possess other disadvantages such as relatively high current noise characteristics. A further disadvantage is in batch to batch non-reproducibility of carbon and graphite inks formulaton of ±25% to ±40% of the effective resistance values. By utilizing a pyropolymeric semi-conducting organic refractory oxide material of the type hereinafter set forth in greater detail as the resistive component of the finished composition of matter, it is possible to overcome these disadvantages and provide a resistor which is tough, flexible and flake-resistant; will compete cost effectively with discrete carbon resistors while yielding equivalent or superior performance characteristics; will have a relatively low current noise as contrasted with the carbon inks; and will require lower curing temperatures to provide a stable resistance.

In one embodiment of this invention the pyropolymeric semi-conducting organic refractory oxide material may comprise a mono-layer of a carbonaceous pyropolymer formed on the surface of a refractory oxide material. The pyropolymeric semi-conducting organic refractory oxide material may be prepared by heating an organic compound in the absence of oxygen and passing the pyrolyzable substance over the refractory oxide material in the vapor phase to deposit a carbonaceous pyropolymer thereon. The refractory oxide material which may be used as the base may be in any form such as loose or compacted dry powders, cast or calcined sols, heated sols, substrates in the form of flats, cylinders, and spheres, rods, pellets, etc. In the preferred embodiment of the present invention the refractory oxide base will be characterized as having a surface area of from 1 to about 500 square meters per gram. Illustrative examples of the refractory oxides which may be used will include alumina in various forms such as gamma-alumina and silica-alumina. In addition it is also contemplated that the refractory oxide may be preimpregnated with a catalytic metallic substance such as platinum, platinum and rhenium, platinum and germanium, platinum and tin, platinum and lead, nickel and rhenium, tin, lead, germanium, etc.

Examples of organic substances which may be pyrolyzed to form the pyropolymer on the surface of the aforementioned refractory oxides will include aliphatic hydrocarbons, cycloaliphatic hydrocarbons, aromatic hydrocarbons, aliphatic halogen derivatives, aliphatic oxygen derivatives, aliphatic sulfur derivatives, aliphatic nitrogen derivatives, heterocyclic compounds, organometallic compounds, etc. Some specific examples of these organic compounds which may be pyrolyzed will include ethane, propane, butane, pentane, ethylene, propylene, 1-butene, 2-butene, 1-pentene, 2-pentene, 1,3-butadiene, isoprene, cyclopentane, cyclohexane, methylcyclopentane, benzene, toluene, the isomeric xylenes, naphthalene, anthracene, chloromethane, bromoethane, chloroethane, bromoethane, chloropropane, bromopropane, iodopropane, chlorobutane, bromobutane, iodobutane, carbon tetrachloride, chloroform, 1,2-dichloroethane, 1,2-dichloropropane, 1,2-dichlorobutane, ethyl alcohol, n-propyl alcohol, isopropyl alcohol, n-butyl alcohol, sec-butyl alcohol, t-butyl alcohol, glycol, glycerol, ethyl ether, isopropyl ether, butyl ether, ethyl mercaptan, n-propyl mercaptan, butyl mercaptan, methyl sulfide, ethyl sulfide, ethyl methyl sulfide, methyl propyl sulfide, dimethyl amine, diethyl amine, ethyl methyl amine, acetamide, propionamide, nitroethane, 1-nitropropane, 1-nitrobutane, acetonitrile, propionitrile, formic acid, acetic acid, oxalic acid, acrylic acid, formaldehyde, acid aldehyde, propionaldehyde, acetone, methyl ethyl ketone, methyl propyl ketone, ethyl propyl ketone, methyl formate, ethyl formate, ethyl acetate, benzyl chloride phenol, o-cresol, benzyl alcohol, hydroquinone, resorcinol, catechol, anisole, phenetole, benzaldehyde, acetophenone, benzophenone, benzoquinone, benzoic acid, phenyl acetate acid, hydrocynamic acid, furan, furfural, pyran, coumarin, indole, etc. It is to be understood that the aforementioned compounds are only representative of the class of compounds which may undergo pyropolymerization and that the present invention is not necessarily limited thereto.

As hereinbefore set forth the aforementioned organic compounds are admixed with a carrier gas such as nitrogen or hydrogen, heated and passed over the refractory oxide base. The deposition of the pyropolymer on the surface of the base is effected at relatively high temperatures ranging from about 400° to about 800° C. and preferably in a range of from about 600° to about 750° C. It is possible to govern the electrical properties of the pyropolymeric semi-conducting organic refractory oxide material by regulating the temperature and the residence time during which the refractory oxide base is subjected to the treatment with the organic pyrolyzable substance. The thus prepared pyropolymeric semi-conducting organic refractory oxide material when recovered will possess a resistivity in the range of from about $10^0$ to about $10^8$ ohm-centimeters. However, if so desired, the pyropolymeric semi-conducting organic refractory oxide material may also be subjected to additional exposure to elevated temperatures ranging from about 500° to about 1200° C. in an inert atmosphere and in the absence of additional pyrolyzable materials for various periods of time, said treatment resulting in the reduction of the electrical resistivity of the lowest resistivity powders by as much as 6 orders of magnitude. By utilizing this additional treatment, the thermal stability of the pyropolymeric material will be improved with respect to temperature cycling in the resistor temperature range, that is, from about 0° to about 100° C., and to alteration of the temperature coefficient of resistance of the finished resistor. While the above material describes one specific method of preparing a pyropolymeric semi-conducting organic refractory oxide material, it is to be understood that we do not wish to be limited to this method of preparing the material, and that any suitable method in which a mono-layer of a carbonaceous material is formed on the surface of a refractory oxde material may also be used to prepare the resistive component of the ink.

The aforementioned pyropolymeric semi-conducting organic refractory oxide material is admixed with other components which make up the final electrical resistor ink. These other components will act as a medium in which the pyropolymeric semi-conducting organic refractory oxide material is carried, and will comprise ingredients which will impart suitable rheological and drying properties to the ink during the application of said ink and desirable physical and electrical properties to the resistor after the ink has set. The suitable rheological properties are dictated by the particular procedure during the application. For example, if the ink is to be applied by silk screening, the ink must have the pseudoplastic properties of low viscosity at high shear rates and high viscosity at low shear rates. This allows the ink to be easily passed through the screen and at the same time will prevent an excessive flow after the application. In addition drying times must be compatible with the application procedure, i.e. must be long enough to prevent equipment fouling but short enough to allow handling and resistor trimming at the earliest possible time. Another important aspect of the formulation of resistive inks is that an electrical continuity must be established between the conductive particles after the ink has dried. Therefore setting of the ink must involve a certain amount of shrinkage so that the excess vehicle or medium by the inter-particle contact points is eliminated. Vehicles which do not have this shrinking property merely encapsulate the conductive particles and do not produce a suitable resistive material. Furthermore, the vehicle properties which are imparted to the finished product constitute another important aspect of resistive ink formulations. The finished resistor, in addition to adhering firmly to the surface on which it is applied, must also make good electrical contact to conductors on which it is applied as well as being reasonably resistant to abrasion and reasonably mechanically flexible.

Therefore, the medium in which the pyropolymeric semi-conducting organic refractory oxide material is carried must meet the aforementioned qualifications. This medium in which the pyropolymeric semi-conducting organic refractory oxide material is carried will comprise a binder and a solvent or oil. Examples of binders which may comprise synthetic or naturally occurring compounds will include naturally occurring compounds such as casein, soya bean oil derivatives, shellac, natural rubber, natural resins such as copals, congos, kauris, gum batu, gilsonite, asphaltic pitches, rosin, shellac, gum elemi, mastic, etc. or synthetic compounds including thermoplastic resins such as polystyrene, polyamide, alkyd resins, acrylic esters, cellulose esters and ethers, polyvinyl alcohol derivatives, etc. or thermosetting resins such as phenolic resins, epoxy resin, melamine resins, unsaturated polyesters, vinyl copolymer resins, urea resins, or varnish, etc., the varnish comprising an oil varnish, a spar varnish, a bituminous varnish, etc.; nitrocellulose, ethyl cellulose.

The oils and solvents which comprise the other component of the vehicle are differentiated on the basis of their viscosity. For example, liquids with a viscosity of less than 0.1 poise at 77° F. are classified as solvents while liquids of a viscosity greater than 1.0 poise at 77° F. are classified as oils, liquids with viscosities between the above two values being classified as either solvents or oils by convention. In addition, the oils may be classified into three groups depending upon their drying characteristics, these classes being (1) a drying oil, (2) a semi-drying oil, and (3) a non-drying oil. In the preferred embodiment of the present invention the preferred oil which may be used as the vehicle for the ink will comprise a drying oil, although other oils may be used as special ingredients for special purposes such as providing plasticity to the ink. Examples of drying oils which may be used will include linseed oil, tung oil, oiticia oil, perilla oil, dehydrated castor oil, safflower oil, soya bean oil, rosin oil, tall oil, hempseed oil, poppyseed oil, etc. Semi-drying oils which may be used include cottonseed oil, rapeseed oil, corn oil, etc. Examples of non-drying oils will include castor oil, peanut oil, olive oil, neatsfoot oil, lard oil, sperm oil, etc. The drying oils may be used as bodying agents, the viscosity of which may be controlled by metal-catalyzed oxidation or thermally induced polymerization. The solvents which may be used with resin binders and the conductive material may be classified on the basis of their composition, said solvents including hydrocarbon solvents, alcohols, aldehydes, acids, ethers, ketones, glycols and esters. Some specific examples of solvents which may be employed include n-pentane, n-hexane, n-heptane, benzene, toluene, the isomeric xylenes, ethylbenzene, ethyl alcohol, n-propyl alcohol, isopropyl alcohol, n-butyl alcohol, acetaldehyde, propionaldehyde, butyraldehyde, acetic acid, propionic acid, phthalic acid, acetone, methyl ethyl ketone, methyl propyl ketone, methyl isopropyl ketone, methyl isobutyl ketone, ethyl propyl ketone, etc., ethylene glycol, diethylene glycol, triethylene glycol, mineral spirits, butyl acetate, amyl acetate, etheylene glycol monoethyl ether acetate, ethylene glycol monobutyl ether, ethylene glycol monoethyl ether, etc.

In addition to the three components hereinbefore set forth, it is also contemplated within the scope of this invention that the electrical resistor ink may also contain other components which will go to make up the finished composition of matter. For example, the electrical resistor ink may also contain a metal in the form of a powder whereby special electrical properties of the finished resistor may be obtained. Specific examples of these metal powders will include copper, silver, gold, nickel, zinc, chromium, cadmium, cobalt, indium or iron, the first three metals being the preferred additives. In addition to the metals hereinbefore enumerated, it is also contemplated that other components which will impart certain properties to the electrical resistor ink may be added such as driers, plasticizers, anti-skinning agents, waxes such as petroleum waxes, carnauba wax, talcs, perfumes to mask unpleasant odors or to hide the presence of vital ingredients, or a color pigment which may be used for coding purposes. Examples of driers which may be added include other metal powders such as cobalt powder, manganese powder, lead powder, or zirconium powder; plasticizers which may be added include soft resins, tributyl phosphate, castor oil; while anti-skinning agents which may be added will include, for example, hydroquinone, catechol, resorcinol, guaiacol, pyrogallol, eugenol, 2,5-di-t-butylhydroquinone, 2-butanone oxime, 2-pentanone oxime, etc. It is to be understood that the aforementioned examples of binders, oils, solvents and additives are only representative of the class of compounds which may be used as components of electrical resistor inks, and that the present invention is not necessarily limited thereto.

The electrical resistor ink may be prepared in any suitable manner. For example, the pyropolymeric semi-conducting organic refractory oxide material which had been prepared according to the method hereinbefore set forth, or by any other method known in the art, may be prepared by grinding the material to an appropriate particle size, said particle size being determined by the desired rheological property of the vehicle, and by the requirements for screening, i.e., lines/inch, etc. In the preferred embodiment of the invention the most desired particle size is that which produces a colloidal suspension of the pyropolymeric semi-conducting organic refractory oxide material in the vehicle. Generally speaking, the material should possess a particle size of less than $20\mu$ and preferably particles less than $10\mu$ are desirable, the optimum size being less than $1\mu$. The thus prepared pyropolymeric semi-conducting organic refractory oxide material is then admixed with the medium by blending with the binder and with the oil or solvent. Alternatively, the pyropolymeric semi-conducting organic refractory oxide material will be admixed with the vehicle component such as the solvent and thereafter ground by means of a roll mill, colloidal mill or ball mill until the particle size previously determined, that is, less than $10\mu$ and, if so desired, less than $1\mu$ is obtained. Following this, the components may be thereafter blended with the binder by means of an inverted blender, mill, etc. The pyropolymeric semi-conducting organic refractory oxide material will be present in the finished electrical resistor ink in an amount determined by the rheological properties of the ink and the electrical and physical properties of the resistor which results therefrom. Generally speaking, the pyropolymeric semi-conducting organic refractory oxide material will be present in the finished electrical resistor ink in an amount in the range of from about 10% to about 95% by weight of the finished composition of matter and preferably in a range of from about 50 to about 90% by weight. As hereinbefore set forth, the electrical resistor ink may also contain other components of the type hereinbefore set forth in greater detail such as preserving agents, color pigments, driers, plasticizers, etc. these components also being added to the three component mixture of the ink in necessary amounts. When admixing a metal powder of the class hereinbefore set forth with the pyropolymeric semi-conducting organic refractory oxide material to obtain desirable electrical and physical characteristics of the finished resistor, it is contemplated that the mixture of pyropolymeric semi-conducting organic refractory oxide material and metal powder will contain from about 95% to about 50% by weight of the pyropolymeric semi-conducting organic refractory oxide material and from about 5% to about 50% by weight of the metal powder. As was also hereinbefore set forth, it is also contemplated within the scope of this invention that two or more pyropolymeric semi-conducting organic refractory oxide materials which possess dissimilar resistivities may be admixed to form the resistive component of the ink. The ratio of a pyropolymeric semi-conducting organic refractory oxide material to another pyropolymeric semi-conducting organic refractory oxide material which is used in the admixture will depend upon which particular resistivity value is desired and so will vary accordingly.

The electrical resistor inks which have been prepared according to the process hereinbefore set forth and which may contain a wide variety of components are formulated for application by any of a variety of methods. Some examples of the way in which the electrical resistor ink may be applied include silk screening, printing, painting, spraying, etc. each application method presenting a different set of rheological conditions which must be met by the particular formulation of the vehicle in which the conductive material is carried. The electrical resistor ink is applied to an appropriate surface such as a printed circuit board in any convenient manner and upon completion of the drying step will form the desired resistor. The wet inks may be either air dried or taken through a predetermined temperature cycle to produce the finished resistor. The particular temperature which is to be employed in the drying cycle will, of course, be dependent upon the particular formulation of the ink vehicle, i.e., whether the vehicle contains a drying oil, a non-drying oil, e semi-drying oil, a solvent or mixtures thereof and may be adjusted to satisfy the individual requirements. The resistors of the finished product will be a function of the resistivity of the conductive material which is present and also of the geometry of the printed resistor. The adjustment of the final value of the resistor can be effected by trimming the particular resistor using standard techniques such as physically removing some of the resistive material by means of grit blasting or by removal of the material utilizing a laser beam.

The resistor after removal of the solvent or oil will form a material, the surface of which possesses a considerable toughness and strength and will be able to withstand abrasion. Therefore, it is contemplated within the scope of this invention to employ the thus formed resistor as a variable resistor in which the electrical contact may be moved over the surface of said resistor utilizing a sufficient amount of pressure to insure complete contact at all times without changes in the resistance due to wear on the surface of the resistor caused by the aforesaid abrasion.

The following examples are given to illustrate the electrical resistor inks and resistors of the present invention. These examples however, are not intended to limit the generally broad scope of the present invention in strict accordance therewith.

Example I

In this example 75 g. of a pyropolymeric semi-conducting organic refractory oxide material which was prepared by treating $\gamma$-alumina with benzene at 700° C. for a period of 4 hours and which possessed a resistivity of $10^0$ ohm-centimeters was milled with 20 cc. of a solvent comprising isopropyl alcohol in a ball mill until the size of the pyropolymeric semi-conducting organic refractory oxide material was less than $10\mu$. When the pyropolymeric semi-conducting organic refractory oxide material had been ground to the desired size, 25 g. of a binder comprising varnish was added to the suspension and thoroughly admixed for an additional period of 0.5 hours. The resulting electrical resistor ink was painted on a laminated board in a strip which was ⅛" wide by ½" long and .005" thick. The resulting resistor was found to have a resistance of 100 ohms.

Example II

An electrical resistor ink was prepared by suspending 80 g. of a pyropolymeric semi-conducting organic refractory oxide material, which was prepared by treating $\gamma$-alumina with benzene at a temperature of 700° C. for a period of 3 hours and which possessed a resistivity of $10^2$ ohm-centimeters, in 100 cc. of methyl isobutyl ketone. The suspension was milled for a period of time sufficient to reduce the particle size of the pyropolymeric semi-conducting organic refractory oxide material to less than $10\mu$. Upon reaching this size 20 g. of a copolymeric mixture of vinyl chloride, vinyl acetate, and vinyl alcohol resin was added and the mixture was mixed in an inverted blender to insure complete integration of the components. The resulting electrical resistor ink was again painted on a laminated board in a manner similar to that set forth in Example I above, the resulting resistor possessing a resistance of $10^4$ ohms.

Example III

To prepare an electrical resistor ink, 75 g. of a pyropolymeric semi-conducting organic refractory oxide material which is prepared by treating $\gamma$-alumina with butane in a nitrogen carrier at a temperature of 650° C. for a period of 4 hours and which will possess a resistivity of $10^4$ ohm-centimeters is suspended in 50 cc. of methyl alcohol. The mixture is placed in a ball mill and treated to reduce the particle size of the pyropolymeric semi-conducting organic refractory oxide material to less than $10\mu$. When the particle size of the pyropolymeric semi-conducting organic refractory oxide material has reached the desired level, 25 g. of ethyl cellulose is added and the components mixed in an inverted blender for a period of 0.5 hours to insure complete integration of the components. The resulting electrical resistor ink is painted on a laminated board in a strip which is ⅛" wide by ½" long and .005" thick. After drying the resulting resistor will have a resistance of $10^6$ ohms.

Example IV

To illustrate another embodiment of the invention 75 g. of pyropolymeric semi-conducting organic refractory oxide material which is prepared by treating $\gamma$-alumina with benzene at a temperature of 700° C. for a period of 4 hours and which possesses a resistivity of $10^0$ ohm-centimeters is suspended in 75 cc. of mineral spirits. The mixture is milled in a ball mill to reduce the particle size of the pyropolymeric semi-conducting organic refractory oxide material to less than $10\mu$. After reaching this size, 10 g. of silver powder and 25 g. of an alkyl resin are added and the components are mixed in an inverted blender for a period of 0.5 hour. The electrical resistor ink is painted on a laminated board in a manner similar to that set forth in Example I above, the resistor which is formed thereby possessing a resistance of 5 ohms.

Example V

To illustrate the ability to control the resistivity of an ink an electrical resistor ink is prepared by admixing 78 g. of a pyropolymeric semi-conducting organic refractory oxide material which possesses a resistivity of $10^6$ ohm-centimeters and 2 g. of a pyropolymeric semi-conducting organic refractory oxide material which possesses a resistivity of 550 ohm-centimeters are suspended in 25 cc. of isopropyl alcohol and the suspension is milled in a ball mill to reduce the particle size of the pyropolymeric semi-conducting organic refractory oxide material to less than $10\mu$. Following this, 20 g. of a binder comprising shellac is added and the components are thoroughly admixed in an inverted blender to insure complete integration of said components. The resulting electrical resistor ink is painted on a laminated board and upon drying the resulting resistor will be found to possess a resistance of 10,000 ohms.

In contrast to this when only the pyropolymeric semi-conducting organic refractory oxide material which possesses a resistivity of $10^6$ ohm-centmeters is suspended in isopropyl alcohol, milled to reduce the particles to the desired size and admixed with a binder comprising shellac, the ink, after being painted on a laminated board and dried, will form a resistor which possesses a resistance of 11,000 ohms. Thus it is possible to effectively control the desired resistivity of a resistor by admixing pyropolymeric semi-conducting organic refractory oxide materials possessing dissimilar resistivities in a predetermined ratio to provide a finished resistor which will possess a particularly desired resistance.

We claim as our invention:

1. In an electrical resistor ink comprising a resistive component dispersed in a liquid vehicle containing a binder of synthetic or natural resin and an oil, solvent or mixture thereof, the improvement which comprises utilizing as a resistive component therefor from about 10% to about 95% by weight of the composition of at least one pyropolymeric semi-conducting material present in particulate form and comprising a refractory inorganic oxide having a surface area of from 1 to about 500 square meters per gram with a monolayer of carbonaceous pyropolymer formed on the surface thereof, said pyropolymeric semi-conducting material being of a particle size of less than $20\mu$ and having a resistivity at room temperature of from about $10°$ to $10^8$ ohm-centimeters.

2. The electrical resistor ink set forth in Claim 1 which also contains a metal powder selected from the group consisting of copper, silver, gold, nickel, zinc, chromium, cadmium, cobalt, indium and iron.

3. The electrical resistor ink set forth in Claim 1 which contains a mixture of pyropolymeric semi-conducting materials, each of which possesses a different resistivity.

4. The electrical resistor ink set forth in Claim 2 in which said metal powder is copper, silver or gold.

5. The electrical resistor ink set forth in Claim 2 in which the ratio of pyropolymeric semi-conducting material to the metal powder in said ink is in the range of 19:1 to 1:1.

6. The electrical resistor ink set forth in Claim 1 in which said pyropolymeric semi-conducting material possesses a resistivity of $10^0$ ohm-centimeters and said vehicle is a varnish and isopropyl alcohol.

7. The electrical resistor ink set forth in Claim 1 in which said pyropolymeric semi-conducting material possesses a resistivity of $10^4$ ohm-centimeters and said vehicle is ethyl cellulose and methyl alcohol.

8. The electrical resistor ink set forth in Claim 2 in which said pyropolymeric semi-conducting material possesses a resistivity of $10^0$ ohm-centimeters, said metal powder is silver powder and said vehicle is an alkyd resin and mineral spirits.

9. The electrical resistor ink set forth in Claim 3 in which one of said pyropolymeric semi-conducting materials possesses a resistivity of $10^6$ ohm-centimeters, the other of said pyropolymeric semi-conducting organic refractory oxide material possesses a resistivity of 550 ohm-centimeters and said vehicle is shellac and isopropyl alcohol.

10. A resistor formed by applying the electrical resistor ink of Claim 1 upon a solid surface and drying said ink.

11. The resistor as set forth in Claim 10 in which said pyropolymeric semi-conducting organic refractory oxide material is present in an amount of from about 50% to about 90% by weight of said dried ink.

12. The resistor as set forth in Claim 10 in which the resistance thereof is in the range of from about $10^0$ to about $10^8$ ohms.

References Cited
UNITED STATES PATENTS

| | | | |
|---|---|---|---|
| 2,671,735 | 3/1954 | Grisdale et al. | 117—46 |
| 3,464,843 | 9/1969 | Basche et al. | 117—106 C |
| 2,610,126 | 9/1952 | Kerridge et al. | 106—26 |
| 2,823,146 | 2/1958 | Roberts et al. | 106—20 X |
| 3,414,417 | 12/1968 | Miller et al. | 106—26 |
| 3,598,761 | 8/1971 | Woulbroun et al. | 117—227 X |
| 3,655,440 | 4/1972 | Brady | 117—227 |
| 3,651,386 | 3/1972 | Youtsey | 136—89 |
| 2,823,146 | 2/1958 | Roberts et al. | 117—212 |
| 3,414,417 | 12/1968 | Miller et al. | 106—26 |
| 2,610,126 | 9/1952 | Kerridge et al. | 106—26 |
| 3,598,761 | 10/1969 | Wouldroun et al. | 117—227 |
| 3,464,843 | 9/1969 | Basche | 117—46 |
| 2,671,735 | 7/1950 | Grisdale et al. | 117—46 |
| 3,740,217 | 6/1973 | Gramza et al. | 96—1.5 |
| 3,782,989 | 1/1974 | Mansur | 117—212 |
| 3,776,772 | 12/1973 | Asada et al. | 117—227 |

JAMES A. SEIDLECK, Primary Examiner

T. S. GRON, Assistant Examiner

U.S. Cl. X.R.

106—23, 32; 117—212, 215, 227